Figure 1:
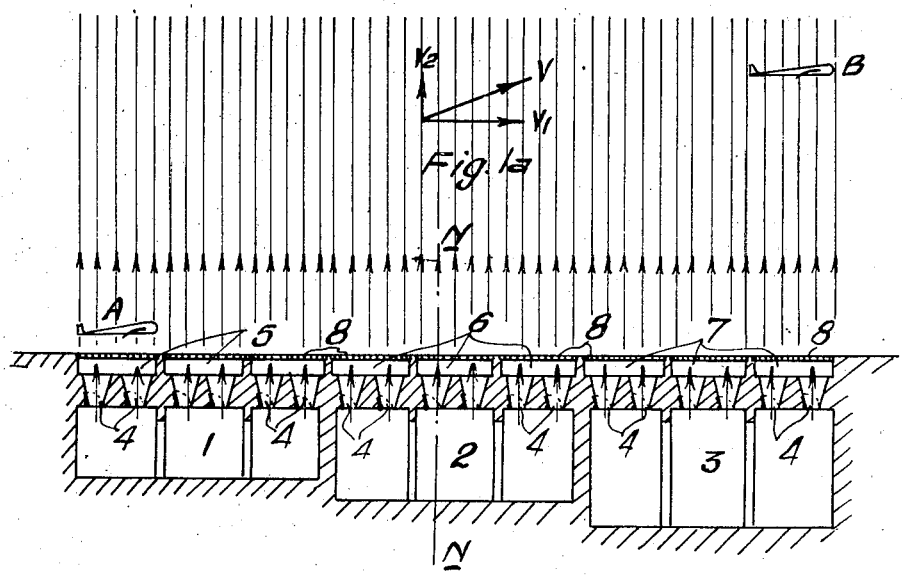

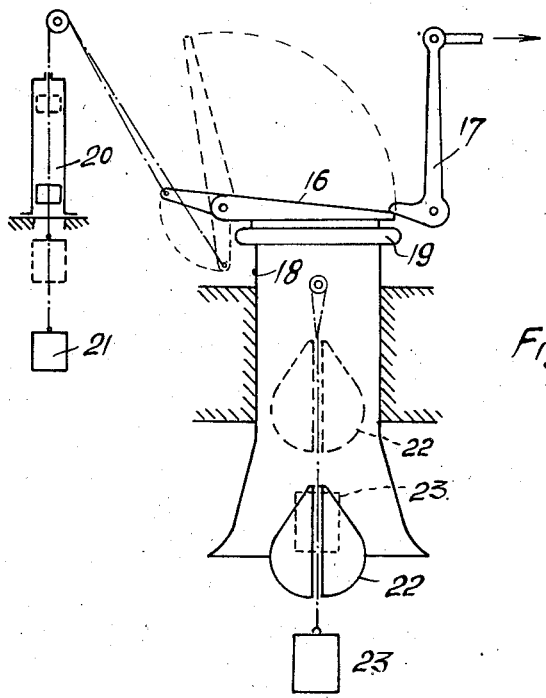
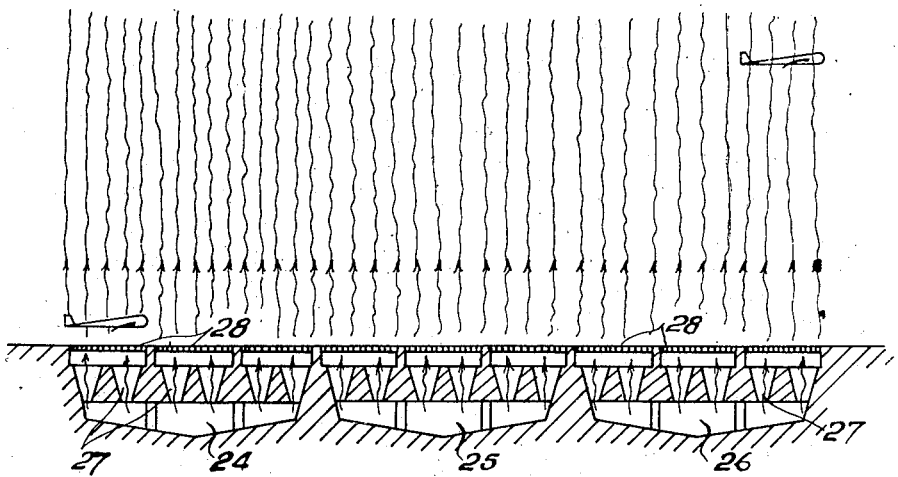

Patented Aug. 15, 1944

2,355,948

UNITED STATES PATENT OFFICE 2,355,948

METHOD AND MEANS FOR ASSISTING THE TAKE-OFF OF LANDPLANES

Thomas Lacey Bonstow and Abraham Elia Margolis, London, England

Application April 17, 1940, Serial No. 330,092
In Great Britain April 14, 1939

2 Claims. (Cl. 244—63)

This invention relates to assisted take-off of land-planes from aerodromes and it is concerned with the application for this purpose of forced draught or pressure waves.

The take-off speed of an aircraft is less than the flying speed due to the additional resistance on ground. This has the disadvantage that the take-off weight is decreased, reducing either the fuel load and thus the range of the aircraft or the pay-load, and thus affecting the economy of aircraft traffic.

The hitherto known methods of assisted take-off by catapulting or composite aircraft are not suitable for big airliners. The first method has the disadvantage of too great an acceleration which prevents its application for passenger traffic, the second is yet in an experimental stage and it has the obvious disadvantage that the lower component can carry only a much smaller upper unit.

The object of the present invention is to avoid these difficulties and to enable the take-off of all kinds of landplanes with the full load they can carry at cruising speed.

According to the present invention the take-off of landplanes is assisted by forced draught produced by air from a wide tunnel located below the concrete runway and covered with iron gratings or provided with multiple apertures in its concrete ceiling.

The lifting force of the air stream is only a question of its velocity which can be regulated by the amount of air blown out. The required amount of air may be rendered available by the arrangement of an underground reservoir for compressed air which is released at the moment when the aircraft, already approaching flying speed, passes over the tunnelled part of the concrete runway. Encountering the forced draught caused by the released air, the aircraft is elevated and proceeds ahead according to the resultant of its velocity and of that produced by the vertical or substantially vertical air stream. The rate of climb is thus considerably increased and in a period of one or two seconds the aircraft is sufficiently high to pass over hangars or over obstructions close to the aerodrome. In consequence, the size of aerodromes can be decreased and their first costs correspondingly reduced. A further advantage is that it is easier to find suitable sites for new aerodromes in closer proximity to towns.

The iron gratings or the apertures in the tunnel ceiling can be arranged with regularly graduated openings to enable a steady increase of the air stream velocity and of the corresponding lifting force, thus avoiding the danger of a sudden structural stress on the aeroplane.

The tunnel below the concrete runway may also be subdivided into two or several sections with a central or individual supplies of compressed air. The volume of the sections and the air pressure can be graduated according to the required amount of air.

The underground reservoir or reservoirs are preferably arranged under the tunnel which has the advantage that the air can be released in the shortest time. It is expedient to arrange the volume of these reservoirs for the lifting of one aircraft only. The air is supplied from a compressor plant either directly or through a central reservoir to enable quick filling. The air pressure and the velocity of the stream can be increased by heating the air in the reservoir.

A quick, almost instantaneous, release of the air is attained by flaps which are automatically opened by the air pressure after the operation of flap-controlling levers either by motor or hydraulic force or by an electro-magnetic device. The amount of air released can also be regulated automatically, in accordance with the air pressure in the reservoirs, either by floating flaps or correspondingly shaped and balanced floating bodies.

The forced draught produced by compressed air can be replaced by pressure waves or impulses caused by the detonation of proportioned small quantities of suitable explosives in quick succession in underground chambers below the tunnel under the concrete runway; the lifting force produced by the pressure waves may be regulated by the weight and number of the charges.

By the extension of the tunnel to the greater part of the runway the lifting effect may be applied also to assisting the landing of aircraft. In consequence the landing speed can be reduced and the landing carried out with a greater degree of safety. A further possibility is the increase of the present limit in the size and weight of the aircraft by the value of the artificial lifting force.

The tunnel below the runway covered with iron gratings or provided with a multiplicity of apertures in its concrete ceiling may be used also for fog dispersion over the runway by blowing out heated air. For this purpose a fan plant and a heating battery with separate conduits to the tunnels is required and the supply of air from this plant has to be cut off when compressed air is to be released for assisted take-off.

Figure 2:
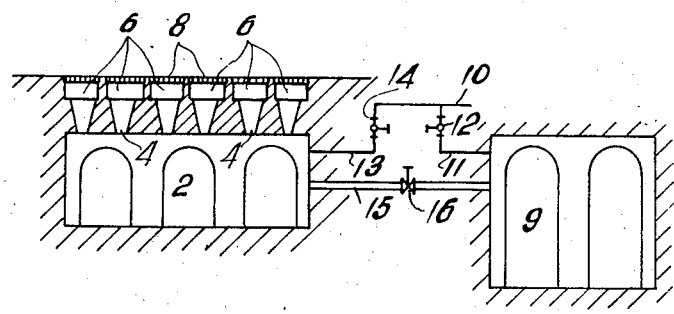

The invention will now be more particularly described, by way of example, with reference to the accompanying drawings, in which Figure 1 illustrates the general arrangement of an assisted take-off plant by means of compressed air, Figure 1a is a diagram referred to hereinafter, Figure 2 is a cross-section on the line N—N of Figure 1, Figure 3 is a diagrammatic elevation of a flap and floating body disposed in each air connection between the air reservoirs and the tunnel, and Figure 4 is a view similar to Figure 1 of a plant operating by means of pressure waves set up by detonation of explosives.

Referring to Figure 1, from a compressor plant which is not shown on the drawings, reservoirs 1, 2 and 3 are filled with compressed air. This air is released from the reservoirs through connections 4 to tunnels 5, 6 and 7 disposed under the concrete runway and covered with iron gratings 8. The air passes through the apertures in the gratings and produces above the runway an upwardly directed air stream. By the lifting force of the air stream the aircraft is elevated and proceeds from position A to position B in accordance with the resultant V of its own average velocity $v_1$ and of that produced by the vertical air stream $v_2$, as shown in diagram Figure 1a. The points A and B indicating the position of the aircraft naturally vary according to the velocities $v_1$ and $v_2$.

The cross-section shown in Figure 2 illustrates the reservoir 2, connections 4, tunnel 6, gratings 8 and a central reservoir 9. From the compressor plant the air is supplied by a pipe 10 and connection 11 with a valve 12 to the central reservoir and by pipe 10 and connection 13 with a valve 14 directly to the reservoir 2. The reservoirs 9 and 2 have also a direct connection 15 with a valve 16 for quick filling of reservoir 2. Similar connections are provided between the reservoir 9 and the reservoirs 1 and 3.

In Figure 3 is a diagrammatically shown the arrangement of a flap and a floating throttling body for the connections 4 between the air reservoirs and the tunnel 5, 6 or 7. The flap 16 is kept in closed position by a bell-crank lever 17 and is tightened up with the air pipe connection 18 by a flexible corrugated joint 19 by the internal air pressure. The flap is opened by the air pressure instantaneously as soon as lever 17 is pulled to the right. The opening of the flap can be slowed down by an air brake 20 counterbalanced by the free air passages and a weight 21.

The passage of the air, which continues for a matter of seconds only, is equalised over this short period, through the connection pipe 18, its passage being throttled down according to the air pressure by the suspended body 22 which is counterbalanced by the weight 23. This body floats in the air in a higher or lower position in accordance with the velocity and density of the air stream in the pipe. With decrease of pressure and air velocity the body 22 drops, and increases the free passage and thus the amount of air.

The general arrangement of assisted take-off plant shown in Figure 4 operates by means of pressure waves produced by detonation of suitable quantities of explosives in quick succession. In the chambers 24, 25 and 26 the explosives are fired producing pressure waves which are transmitted by connections 27 to tunnels 28 and thence through the gratings to the space above the runway.

What we claim and desire to secure by Letters Patent is:

1. A method of assisting the take-off of landplanes which comprises the creation of gas pressure along a runway by successively detonating proportioned quantities of explosives to set up pressure waves and releasing said pressure waves to the runway as a substantially vertically directed forced draught whereby a rapid vertical lift is imparted to the plane independently of the lift resulting from air resistance encountered by the wings of the plane.

2. Apparatus for use in the practice of the herein described method of assisting the take-off of landplanes consisting of a straight, elongated, stationary runway having a wide tunnel located below same, a source or air under pressure, said runway having openings therethrough communicating with said tunnel and discharging in substantially vertical lines along the length of the runway, means whereby air from said source may be delivered to said tunnel to cause a vertical air stream along the length of the runway in the direction of movement of a plane during take-off whereby a rapid vertical lift is imparted to the plane independently of the lift resulting from resistance encountered by the wings of the plane, and means controlling the flow of air from said source to said tunnel comprising flaps in the means for delivering air from said source to said tunnel, and floating throttling devices actuated by the flow of air, whereby the force of the air stream is automatically regulated according to the available pressure at said source.

THOMAS LACEY BONSTOW.
ABRAHAM ELIA MARGOLIS.